United States Patent [19]

Morris et al.

[11] Patent Number: 4,659,059
[45] Date of Patent: Apr. 21, 1987

[54] SEALED DASHPOT MECHANISM FOR DELAYED CLOSING PLUMBING VALVES

[75] Inventors: Earl L. Morris, La Habra Heights; Theodore J. Sally, Graton; Ron T. Hahn, Fullerton, all of Calif.

[73] Assignee: Acorn Engineering Company, City of Industry, Calif.

[21] Appl. No.: 822,383

[22] Filed: Jan. 27, 1986

[51] Int. Cl.⁴ .............................................. F16K 31/48
[52] U.S. Cl. .................... 251/54; 137/454.6; 251/357; 251/360; 251/900
[58] Field of Search ............... 137/454.6; 251/54, 121, 251/205, 335.2, 357, 360, 900

[56] References Cited

U.S. PATENT DOCUMENTS

| | | | |
|---|---|---|---|
| 3,612,479 | 10/1971 | Smith | 251/900 X |
| 3,746,036 | 7/1973 | Du Bois et al. | 251/61.3 X |
| 3,933,337 | 1/1976 | Morris et al. | 251/54 |
| 4,093,177 | 6/1978 | Morris et al. | 251/54 |
| 4,483,508 | 11/1984 | Marsh et al. | 251/61.3 |

Primary Examiner—Gerald A. Michalsky
Attorney, Agent, or Firm—Edgar W. Averill, Jr.

[57] ABSTRACT

An improved, delayed closing plumbing valve of the type having a cartridge with hydraulic fluid in a sealed chamber retained between an upper and lower diaphragm positioned about a longitudinally movable valve stem assembly. The chamber has a one-way piston which divides the chamber into an upper and lower section, and there is a restricted fluid flow path between the two sections. A water shut off gasket is at the base of a valve stem and has a removable gasket ring to permit the replacement of the gasket. The valve seat may also be removable for replacement. The lower diaphragm is provided with a sealed chamber to prevent its degradation by particles in the water. The diaphragms at the upper and lower end of the chamber are retained and sealed to the valve stem by retaining rings having a conical upper end which holds the inner part of the diaphragm against the valve stem. The diaphragms preferably permit the turning of the valve stem with respect to the cartridge without damage to the diaphragms.

18 Claims, 5 Drawing Figures

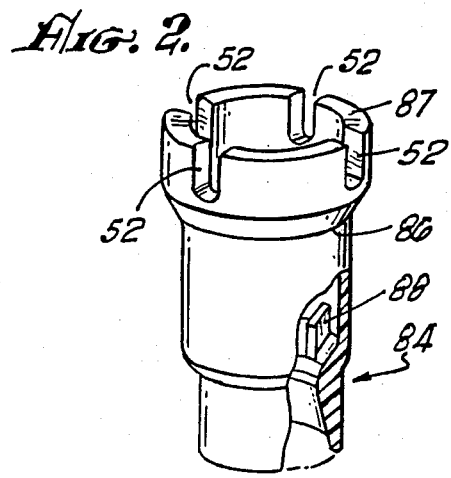
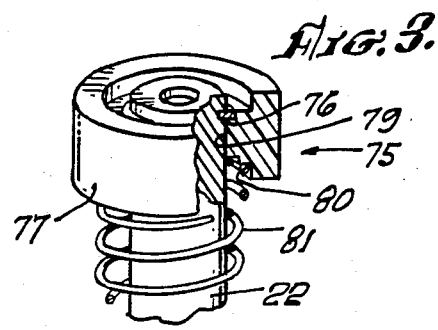
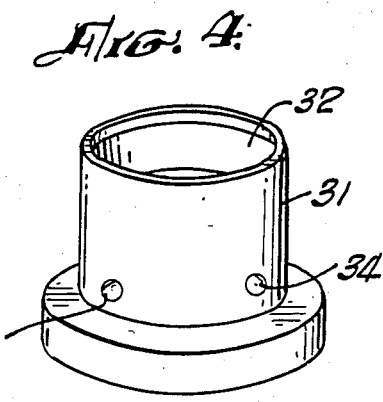
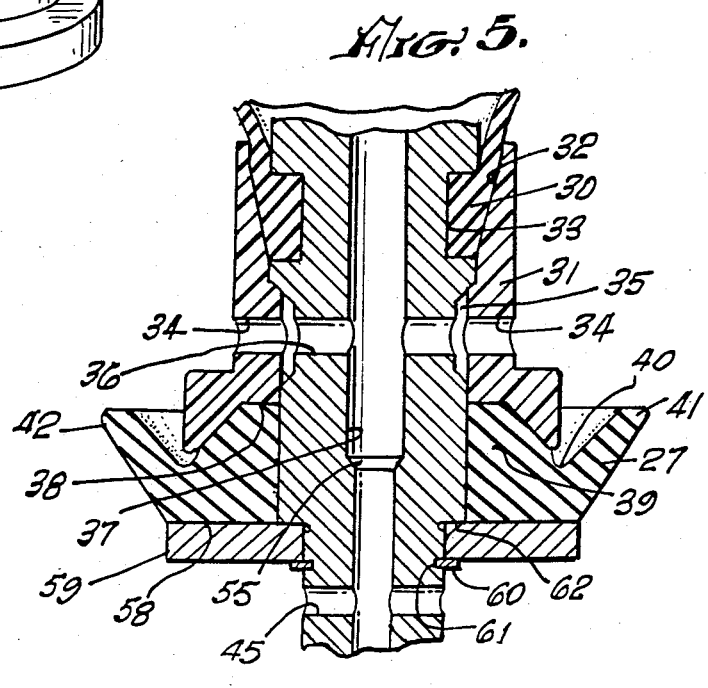

SEALED DASHPOT MECHANISM FOR DELAYED CLOSING PLUMBING VALVES

BACKGROUND OF THE INVENTION

The field of the invention is plumbing valves, and the invention relates more particularly to delayed closing plumbing valves of the type having hydraulic fluid in a sealed chamber, retained between an upper and lower diaphragm positioned about a longitudinally movable valve stem assembly.

Delayed closing valves of this type are shown in three patents which are assigned to the same assignee as the present application, namely, U.S. Pat. Nos. 3,933,337, 4,093,177 and 4,165,857. The present invention comprises an important improvement over these designs. For instance, in the most recent patent, namely, No. 4,165,857, the lower diaphragm indicated in Figure 1B by reference character 43 had its lower surface exposed to water. If a grain of sand, or other foreign object, became lodged in the loop formed by the rolling diaphragm, then a hole could be worn through the diaphragm allowing water to enter the chamber 82 and permitting the silicone fluid to escape. Also, the diaphragms of these devices are glued or sealed to both the valve stem and to the body so that the turning of the stem with respect to the body would cause a tearing of the diaphragms. Furthermore, if the valve head 23 became worn causing the valve to leak, there was no way that it could be replaced. Also, if the valve seat became pitted or corroded, it, also, could not be replaced or resurfaced.

SUMMARY OF THE INVENTION

It is, thus, an object of the present invention to provide a delayed closing plumbing valve having a protected lower rolling diaphragm. It is another object of the present invention to provide an improved, delayed closing valve which has a removable and replaceable valve seat and valve gasket.

It is another object of the present invention to provide a delayed closing plumbing valve having an improved holding means for attaching the diaphragms to the valve stem.

The present invention is for an improved, delayed closing plumbing valve of the type having a cartridge with hydraulic fluid in a sealed chamber retained between upper and lower diaphragms positioned about a longitudinally movable valve stem assembly. The valve stem assembly is of the type having a deformable valve gasket means for controlling the flow of water and has a one-way piston or check valve in a fluid-filled chamber which separates the chamber into an upper compartment and a lower compartment with a restricted fluid flow path therebetween. Such valves have biasing means aided by water pressure which urge the stem assembly in a direction so that the valve gasket means seats against a valve seat, and the valve cartridge is assembled in an exterior cartridge housing. The improvement of the present invention includes a movable valve seat means, removably affixed at its upper end to the exterior cartridge housing, and the valve seat means has a generally cylindrical hollow housing, having a partially restricted portion at the inner surface near the lower end thereof which is slightly smaller in inside diameter than the outside diameter of the deformable valve gasket means, but which is large enough to permit the passage of the deformable valve gasket means therethrough. The partially restricted portion comprises a valve seat which prevents the flow of water past the valve seat when the valve gasket is positioned therein. The generally cylindrical housing has a hollow body portion which is larger than the lower portion of the exterior cartridge housing which it surrounds which permits the flow of water between the lower portion of the valve exterior cartridge housing and the inner portion of the generally cylindrical housing. Cartridge mounting means, including an angled sealing surface, is located on the exterior surface of the generally cylindrical housing to permit the affixing of the plumbing valve in a plumbing valve body. At least one passageway is formed through the generally cylindrical housing above the angled sealing surface for the passage of water therethrough, whereby when the valve means is open, water may pass into the interior of the generally cylindrical housing, upwardly through the hollow body portion and outwardly through the passageway. When said removable valve seat means is removed, the deformable valve gasket means may be replaced. In a preferred embodiment, a lower diaphragm protecting chamber is positioned beneath the lower diaphragm and has an outer shell affixed to the exterior cartridge housing of the valve. The outer shell has a smooth interior bore which contains a chamber sealing ring which is affixed to the valve stem assembly, and the sealing ring slides along the interior surface of the smooth bore. Preferably, the sealing ring is also used as a biasing spring retainer. The improved diaphragm retaining ring of the present invention has a circular base at the lower end which is held by the valve stem assembly, and an inner conical surface is pushed upwardly over the exterior of the inner ring of the diaphragms. The upper retaining ring, preferably, also holds a one-way piston or movable check valve in its proper place in the hydraulic fluid filled chamber.

BRIEF DESCRIPTION OF THE DRAWINGS

FIG. 2 is an enlarged perspective view, partially cut away, of the removable valve seat means of the valve of FIG. 1.

FIG. 3 is a perspective view, partially cut away, of a portion of the valve stem assembly including the chamber sealing ring which protects the lower diaphragm.

FIG. 4 is a perspective view of the diaphragm retaining ring of the valve of FIG. 1.

FIG. 5 is an enlarged cross-sectional view of the one-way piston portion of the valve of FIG. 1.

DESCRIPTION OF THE PREFERRED EMBODIMENTS

Figure 1:
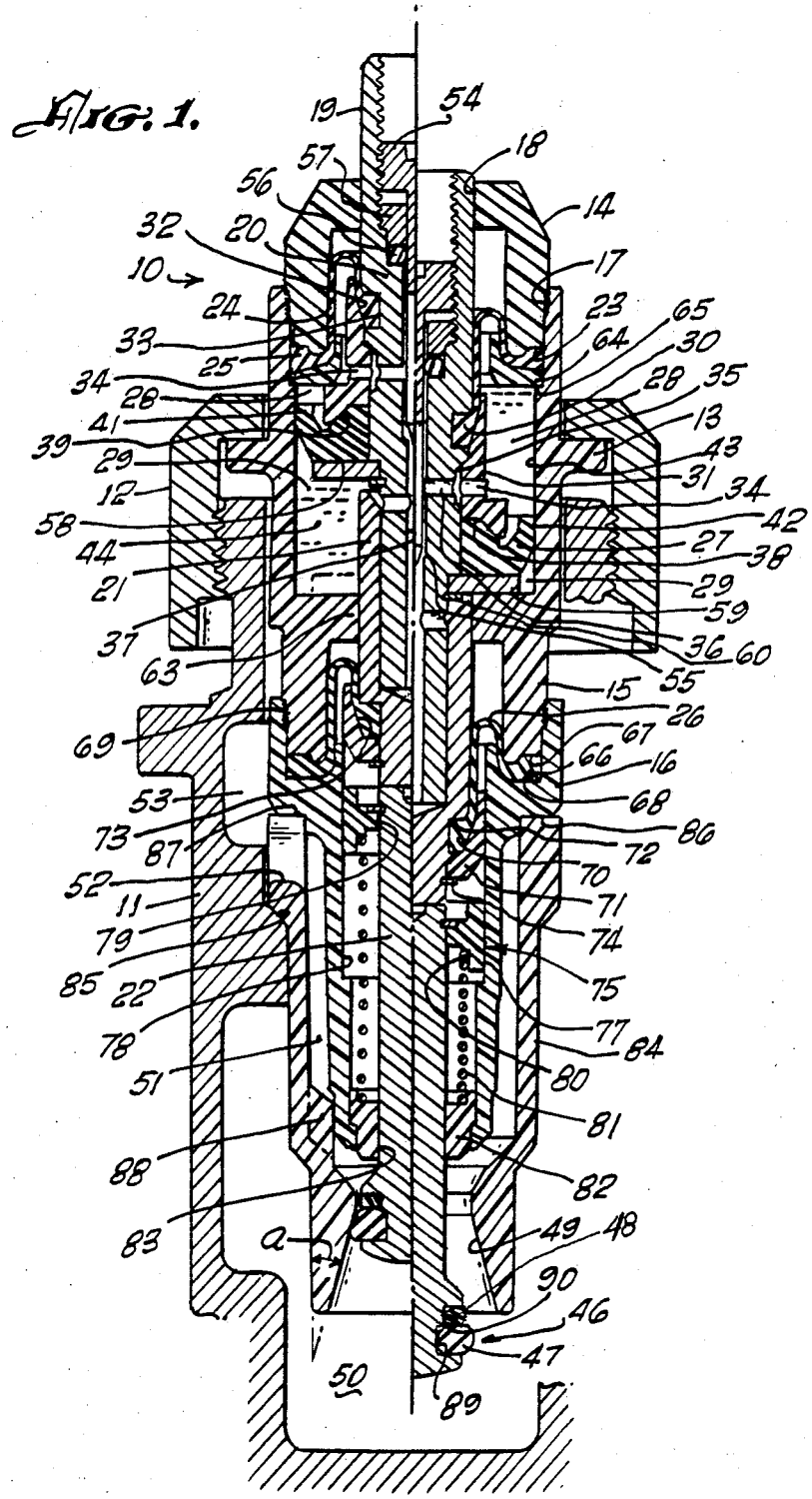
FIG. 1 is a cross-sectional view of the improved, delayed closing plumbing valve of the present invention.

The delayed closing plumbing valve of the present invention is shown in cross-sectional view in FIG. 1 and indicated generally by reference character 10. Valve cartridge 10 is held to a plumbing fixture body 11 by a brass bonnet 12 which tightens against flange 13 on the exterior of the valve body housing. The exterior valve body housing is made up of three major elements, namely, a top bearing 14, a central cylinder 15 and a spring housing 16. Although such parts may be fabricated from brass, it is advantageous that they be fabricated from a polymer such as the acetal homopolymer sold under the trademark, "Delrin." Such polymer has resistance to corrosion, is lightweight and is capable of withstanding the temperature and pressures commonly occurring in water valve environments.

Top bearing 14 is ultra-sonically welded at 17 to the top of central cylinder 15. Top bearing 14 has a central opening 18 which supports the projecting end 19 of the valve stem assembly.

The valve stem assembly is, likewise, made up of three major pieces, namely, an upper orifice portion 20, a middle stem 21 and a lower stem 22.

The projecting end 19 of the upper orifice portion 20 of the valve stem assembly is supported by the central opening 18 in top bearing 14 and moves freely therethrough. Top bearing 14 also has a bottom recess 23 which holds the outer ring 25 of upper diaphragm 24.

Upper diaphragm 24 and lower diaphragm 26 define a compartment for holding a hydraulic fluid such as a silicone oil and this compartment, itself, is broken into two compartments by a one-way piston or moveable check valve 27, namely, an upper compartment 28 and lower compartment 29. It is important that the hydraulic fluid be separated from contamination, particularly, contamination from water and, thus, it is essential that the diaphragms 24 and 26 be securely sealed at both their outer rings and at their inner rings. Thus, inner ring 30 of upper diaphragm 24 is securely held to the upper orifice portion 20 by a retaining ring 31. It is, however, beneficial that the upper diaphragm be permitted to turn with respect to either the valve stem or the cartridge. If one were to take a pair of pliers and turn the projecting end of the valve stem assembly with respect to the cartridge, the diaphragm would be torn if such turning were not permitted. Since it is desirable to make the assembly of the present invention as vandal proof as possible, such turning is permitted.

Ring 31 is shown in perspective view in FIG. 4 and can be seen to have an upwardly directed conical opening 32 which is pushed upwardly over inner ring 30 which is also held in a groove 33 in the upper orifice portion 20 of the valve stem assembly. This securely holds the inner ring of the diaphragm against the valve stem assembly in a fluid tight relationship. It can be also seen that ring 31 has a plurality of passageways 34 which communicate with a space 35 in the interior surface of ring 31 which, in turn, permits the flow of fluid into a transverse passageway 36 which, in turn, communicates with the axial opening 37 in the orifice portion 20 of the valve stem assembly.

It can also be seen clearly in FIG. 5 that the annular recess 38 at the bottom of ring 31 serves to hold one-way piston 27 in a fluid-tight manner against the orifice portion 20 of the valve stem assembly. One-way piston 27 has an inner annular ring 39 which gradually narrows at 40 where the piston expands upwardly and outwardly into a lip seal portion 41. The outer edge 42 of the lip seal contacts the inner surface 43 as shown in FIG. 1. It can be readily observed that as the valve stem assembly and one-way piston 27 are moved downwardly as oriented in FIG. 1, that the hydraulic fluid 44 moves with ease around the outer edge 42 of piston 27. However, when the piston is moved upwardly, the lip seal 41 moves against the inner surface 43 preventing the flow of fluid around the lip seal and, thus, the fluid is required to move through axial opening 37 where it flows into the lower compartment 29 through transverse passageway 45.

As is evident from FIG. 1, as the valve gasket 46 moves away from the valve seat 49, water may flow from the line pressure compartment 50 through annular passageway 51 out of openings 52 and into the water outlet compartment 53 and from there to the faucet or other water outlet. The rate at which the valve gasket moves upwardly into its closed position, as shown in the left-half of FIG. 1, is controlled by the rate of hydraulic fluid flow through the fluid path including axial opening 37. The rate of flow of fluid is readily adjusted by turning needle valve 54 toward or away from needle valve seat 55 in a conventional manner. Needle valve 54 is sealed in axial opening 37 by an O-ring 56 which, in turn, is sealed by a nut 57 which has a hexagonal opening, larger than the needle of the needle valve.

Returning now to the placement of the one-way piston 27 against the upper orifice portion 20 of the valve stem assembly, it can readily be seen in FIG. 5 that the lower surface 58 of one-way piston 27 abuts a brass retaining ring 59 and is held by a stainless snap ring 60 held in a groove 61 formed in the orifice portion 20 of the valve stem assembly. Note also that a step 62 is formed in the orifice portion of the valve stem assembly so that the downward movement of the valve stem assembly is securely stopped by the abutment of the brass retaining ring 59 against a shoulder 63 positioned in the interior of central cylinder 15.

Returning now to the sealing of the diaphragms to the exterior cartridge housing, the upper diaphragm 24 has an outer ring 25 which is held against the bottom recess 23 of top bearing 14 by a retaining ring 64 which rests on a shoulder 65 formed on the inner surface of central cylinder 15. The outer ring 25, thus, may be compressed by top bearing 14 to securely seal the outer ring against fluid leak. Similarly, the outer ring 66 of lower diaphragm 26 is held between a recess 67 formed at the base of central cylinder 15 and a recess 68 formed in the upper end of spring housing 16. Spring housing 16 is held to central cylinder 15 by an ultra-sonic weld 69, and it can be seen that the outer ring 66 is securely held between these two members. The inner ring 70 of lower diaphragm 26 is held against a shoulder 72 in middle stem 21 by a retaining ring 71 which, like ring 31, has a conical opening 73. Retaining ring 71 is held in place by a stainless snap ring 74 held in a mating groove in middle stem 21.

An important feature of the present invention is the means used to protect the undersurface of lower diaphragm 26 from wear and abrasion from foreign particles in the water. This is accomplished by a chamber sealing ring shown in perspective view in FIG. 3 and indicated by reference character 75. Chamber sealing ring 75 is held against upward movement by a snap ring 76 held in a groove in lower stem 22. Chamber sealing ring 75 is, preferably, formed from a polymer such as an acetal homopolymer. Ring 75 has a smooth outer surface 77 which rides along the smooth inner surface 78 of spring housing 16. The inner surface 79 of chamber sealing ring 75 tightly fits along the outer surface of lower stem 22 and prevents any particles from entering past sealing ring 75. A spring retaining recess 80 retains a spring 81 which provides the force, together with water pressure, for returning the valve stem assembly to its upper, or closed, configuration. Spring 81 is, preferably, a stainless steel spring and its lower end is held by a spring retainer and bearing 82. A slight opening is provided between the inner surface 83 of bearing 82 and lower stem 22 to permit the flow of a very small amount of water held below sealing ring 75 and spring retainer 82. Spring retainer and bearing 82 is still available to hold lower stem 22 in its approximately axial position.

Another important feature of the present invention is the ability of the valve of the present invention to be serviced. This is brought about by the removability of the valve seat housing 84. Valve seat housing 84 is held securely against spring housing 16 by the upward force created by its contact with shoulder 85 of plumbing fixture body 11 and the downward force generated by the tightening of brass bonnet 12 which moves spring housing 16 downwardly where its lower surface 86 abuts the upper surface 87 of valve seat housing 84. When brass bonnet 12 is removed, the entire assembly may be lifted from plumbing fixture body 11, and valve seat housing 84 may simply be pulled away from spring housing 16. Valve gasket 46 comprising O-rings 47 and 48 pass completely through valve seat 49 and, thus, are exposed for inspection or replacement. Similarly, if the valve seat 49 becomes somehow scored or damaged, the entire valve seat housing 84 may readily be replaced. It should be noted that valve seat housing 84 has a plurality of support ribs 88 which contact the exterior base of spring housing 16, helping to retain it in accurate central alignment with respect to valve seat 49.

Yet another important invention is the ability of the delayed closing valve to close without chatter or noise. This is brought about by the provision of a pair of O-rings of different size. The larger O-ring 47 has a larger cross-sectional diameter than O-ring 48. Similarly, O-ring 47 is placed in a first step 89 of a groove, which step has a smaller outside diameter than second step 90 which holds O-ring 48. This combination silences the chatter as the valve stem assembly slowly causes valve gasket 46 to move upwardly into valve seat 49. The slope of valve seat 49, as it widens downwardly, is fifteen degrees from the vertical which has also resulted in a quietly closing valve. This angle is indicated by reference character "a" in FIG. 1.

With the exception of the valve stem assembly, brass bonnet 12, brass retaining ring 59, the snap rings and the spring, essentially all the remaining parts of the valve may be fabricated from polymeric materials which are free from any corrosion and light in weight.

A hydraulic fluid which has been found to be successful in the delayed closing valve comprises a non-toxic silicone fluid identified by the trademark, "Dow Corning 1000CS." The diaphragms may be made from a urethane polymer as may the one-way piston. While an elastomeric one-way piston is shown in the drawings, other one-way pistons could likewise, alternatively, be used. For instance, a rigid piston having large holes therethrough which are parallel to the axis of the valve and which has the upper surface of the piston and holes covered by a movable spring loaded disk could perform the same function.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved, delayed closing plumbing valve of the type including a cartridge mounted in a fixture body, said cartridge having hydraulic fluid in a sealed chamber retained between an upper and a lower diaphragm positioned about a longitudinally movable valve stem assembly including deformable valve gasket means for controlling the flow of water and having a one-way piston which separates said chamber into an upper compartment and a lower compartment with a restricted fluid flow path therebetween and having biasing means urging said stem assembly in a direction so that its valve gasket means seats against a valve seat, the cartridge being affixed in a fixture body, wherein the improvement comprises:

removable valve seat means removably affixed at its upper end to send cartridge, said removable valve seat means being free of contact with said lower diaphragm, said valve seat means comprising:

a generally clindrical hollow housing having a partially restricted portion at the inner surface near the lower end thereof which is slightly smaller in inside diameter than the outside diameter of said deformable valve gasket means, but which is large enough to permit the passage of said deformable valve means therethrough, said partially restricted portion comprising a valve seat to prevent the flow of water past said valve seat when said valve gasket is positioned therein;

cartridge and removable valve seat mounting means on the fixture body to direct the flow of all water between the valve gasket and the valve seat; and at least one water passageway above said mounting means for the passage of water whereby when said valve means is open, water may pass into the interior of said generally cylindrical hollow housing and outwardly through said at least one passageway, and when said removable valve seat means is removed from said housing, said deformable valve gasket means may be replaced.

2. The improved, delayed closing plumbing valve of claim 1 wherein said deformable valve gasket means moves downwardly out of said value seat to open said plumbing valve.

3. The improved, delayed closing plumbing valve of claim 1 wherein said deformable valve gasket means comprises a pair of stacked O-rings comprising an upper O-ring and a lower O-ring held by said valve stem assembly.

4. The improved, delayed closing plumbing valve of claim 3 wherein the diameter of the cross-sectional circle of one of said O-rings is larger than that of the other O-ring.

5. The improved, delayed closing plumbing valve of claim 4 wherein the lower of the pair of O-rings is the larger in diameter of the cross-sectional circle.

6. The improved, delayed closing plumbing valve of claim 4 wherein said O-rings are held in said valve stem assembly by a stepped groove, and the groove holding the O-ring having the larger cross-sectional diameter is smaller in outside diameter than that of the groove holding the smaller O-ring.

7. The improved, delayed closing plumbing valve of claim 1 wherein the valve seat has a conical portion at the lower end of the removable valve seat means, the slope of said conical portion having an angle of about fifteen degrees with respect to the longitudinal axis of said valve.

8. An improved, delayed closing plumbing valve of the type including a cartridge mounted in a fixture body, said cartridge having hydraulic fluid in a sealed chamber retained between an upper and a lower diaphragm positioned about a longitudinally movable valve stem assembly including deformable valve gasket means for controlling the flow of water and having a one-way piston which separates said chamber into an upper compartment and a lower compartment with a restricted fluid flow path therebetween and having biasing means urging said stem assembly in a direction so that its valve gasket means seats against a valve seat, the cartridge being affixed in a fixture body, wherein the improvement comprises:

a lower diaphragm protecting chamber comprising:

a cylindrical compartment affixed to the cartridge, said compartment having a smooth interior bore portion, said interior bore portion being axially aligned with said valve stem assembly;

a chamber sealing ring affixed to the valve stem assembly below the lower diaphragm, the outer periphery of said sealing ring abutting the smooth interior bore and preventing any particles in the water being controlled from touching the undersurface of the lower diaphragm.

9. The improved delayed closing plumbing valve of claim 8 further including spring means held at the base of the interior of said compartment and wherein said sealing ring is also a spring retaining ring and holds the upper end of said spring means.

10. The improved delayed closing plumbing valve of claim 9 wherein said spring means is held at the base of said compartment by a spring keeper and bearing ring held by said the wall of said compartment and having an inner bore which is slightly larger than the outside diameter of said valve stem assembly at the area surrounded by said bearing ring so that water may move between said bearing ring and said valve stem assembly, but the bearing ring prevents the longitudinal axis of the bottom portion of said valve stem assembly from moving significantly away from the longitudinal axis of said exterior housing of the plumbing valve.

11. An improved, delayed closing plumbing valve of the type having hydraulic fluid in a sealed chamber retained between an upper and a lower diaphragm, having an outer diaphragm-retaining ring affixed to the interior surface of the exterior housing of the plumbing valve, and an inner diaphragm-retaining ring affixed in a groove in a valve stem assembly of the plumbing valve, and a folded diaphragm surface therebetween so that the diaphragms roll as the valve stem assembly moves longitudinally in the exterior housing, said valve stem assembly including deformable valve means and having a one-way piston which separates said chamber into an upper compartment and a lower compartment with a restricted fluid flow path therebetween and having biasing means urging said stem assembly in a direction so that its valve gasket means seats against a valve seat, the plumbing valve being assembled in a cartridge having an exterior housing, wherein the improvement comprises:

upper and lower diaphragm retaining rings comprising:

a circular base at the lower end thereof, said circular base being held by said valve stem assembly against downward movement;

an inner conical surface at the upper end of said retaining rings, said conical surface pressing against the exterior of the inner ring of said diaphragms.

12. The improved delayed closing plumbing valve of claim 11 further including a step in said valve stem assembly positioned below each groove which holds the inner ring of each diaphragm and a corresponding step in the inner surface of said retaining rings so that the upward movement of said retaining rings is limited by the abutment of said steps.

13. The improved delayed closing plumbing valve of claim 11 wherein the one-way piston is an elastomeric ring having an upwardly directed lip seal and wherein the upper diaphragm retaining ring also has a lower frustro-conical portion which surrounds and holds the elastomeric ring against the valve stem assembly.

14. The improved delayed closing plumbing valve of claim 13 wherein the bottom of said elastomeric ring is held along said valve stem assembly by a retaining ring, and wherein said retaining ring is held to the valve stem assembly at its upper surface by a shoulder in said valve stem assembly and at its lower surface by a snap ring, and further wherein said exterior housing has an inwardly directed shoulder positioned so that it abuts said retaining ring when said valve stem assembly is in its lowermost position.

15. The improved, delayed closing plumbing valve of claim 11 wherein said valve stem assembly is a three-part assembly comprising:

an upper section extending upwardly above said sealed chamber and including the groove which holds the interior ring of the upper diaphragm and which also includes the portion of the valve stem assembly which holds the one-way piston;

a middle section including the groove which holds the interior ring of the lower diaphragm; and a lower section which holds the valve means.

16. The improved, delayed closing plumbing valve of claim 15 wherein the upper section includes an axial bore extending from the top thereof, which axial bore intersects an upper transverse passageway located above said one-way piston and a lower transverse passageway located below said one-way piston, and said axial bore has a needle valve seat positioned therein between said upper and lower transverse passageways, and said axial bore further includes needle valve means which is movable toward said needle valve seat whereby the resistance to flow from the upper compartment to the lower compartment can be regulated by the movement of said needle valve.

17. The improved, delayed closing plumbing valve of claim 11 wherein rotational movement is permitted between each of said upper diaphragm and said valve stem assembly.

18. The improved, delayed closing plumbing valve of claim 11 wherein rotational movement is permitted between each of said upper diaphragm and the exterior housing.

* * * * *